(12) United States Patent  (10) Patent No.: US 8,577,887 B2
Joshi et al.  (45) Date of Patent: Nov. 5, 2013

(54) CONTENT GROUPING SYSTEMS AND METHODS

(75) Inventors: Parag M. Joshi, Los Gatos, CA (US);
Jian-Ming Jin, Beijing (CN);
Sheng-Wen Yang, Beijing (CN);
Samson J. Liu, Mountain View, CA (US); Nina Bhatti, Los Altos, CA (US); Suk Hwan Lim, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 339 days.

(21) Appl. No.: 12/639,768

(22) Filed: Dec. 16, 2009

(65) Prior Publication Data

US 2011/0145249 A1 Jun. 16, 2011

(51) Int. Cl.
*G06F 17/30* (2006.01)

(52) U.S. Cl.
USPC .......................................................... 707/738

(58) Field of Classification Search
USPC ................................. 707/736–738
See application file for complete search history.

(56) References Cited

U.S. PATENT DOCUMENTS

| | | | |
|---|---|---|---|
| 6,260,008 B1 | 7/2001 | Sanfilippo | |
| 6,374,242 B1 | 4/2002 | Childs et al. | |
| 6,735,583 B1 | 5/2004 | Bjarnestam et al. | |
| 6,826,726 B2 | 11/2004 | Hsing et al. | |
| 7,016,895 B2 | 3/2006 | Dehlinger et al. | |
| 7,017,113 B2 | 3/2006 | Bourbakis et al. | |
| 7,032,225 B2 | 4/2006 | Wang et al. | |
| 7,137,062 B2 * | 11/2006 | Kaufman et al. | 715/200 |
| 7,152,056 B2 | 12/2006 | Snyder | |
| 7,185,001 B1 | 2/2007 | Burdick et al. | |
| 7,363,309 B1 | 4/2008 | Waite et al. | |
| 7,386,442 B2 | 6/2008 | Dehlinger et al. | |
| 7,418,444 B2 | 8/2008 | Flank et al. | |
| 7,490,040 B2 | 2/2009 | Pickering | |
| 7,542,958 B1 * | 6/2009 | Warren et al. | 706/48 |
| 2004/0006457 A1 * | 1/2004 | Dehlinger et al. | 704/5 |
| 2007/0260980 A1 | 11/2007 | Freeman et al. | |
| 2008/0134015 A1 * | 6/2008 | Milic-Frayling et al. | 715/206 |
| 2009/0070366 A1 * | 3/2009 | Zhao et al. | 707/102 |
| 2009/0164512 A1 * | 6/2009 | Aizenbud-Reshef et al. | 707/104.1 |
| 2010/0082673 A1 * | 4/2010 | Nakano et al. | 707/776 |

(Continued)

OTHER PUBLICATIONS

Parag Mulendra Joshi, "Web Document Text and Images Extraction using DOM Analysis and Natural Language Processing", http://www.hpl.hp.com/techreports/2009/HPL-2009-187.pdf.

(Continued)

*Primary Examiner* — John E Breene
*Assistant Examiner* — Joshua Bullock

(57) ABSTRACT

A method of grouping a plurality of media content is provided. The method includes converting at least a portion of the media content into at least one document object model ("DOM") using a processor. The DOM can include a plurality of block elements, each comprising at least one content object. The method includes apportioning the content objects into a relevant portion and an irrelevant portion and extracting a set of keywords, the set comprising at least one keyword, within the relevant portion of the content objects. The method includes apportioning the relevant portion of the content objects into a related portion and an unrelated portion using at least a portion of the set of keywords and grouping the related portion of the content to provide a group of related content.

13 Claims, 12 Drawing Sheets

(56) References Cited

U.S. PATENT DOCUMENTS

| | | | |
|---|---|---|---|
| 2010/0174732 A1* | 7/2010 | Levy et al. | 707/768 |
| 2010/0174976 A1* | 7/2010 | Mansfield et al. | 715/234 |
| 2010/0174977 A1* | 7/2010 | Mansfield et al. | 715/234 |
| 2010/0217592 A1* | 8/2010 | Gupta et al. | 704/236 |
| 2010/0268720 A1* | 10/2010 | Spivack et al. | 707/756 |
| 2011/0066615 A1* | 3/2011 | Pradhan et al. | 707/737 |

OTHER PUBLICATIONS

Thomas Hofmann, "Probabilistic Latent Semantic Analysis", EECS Dept, UC Berkeley & Int'l Computer Science Institute, http://www.cs.brown.edu/~th/papers/Hofmann-UA.pdf, 1999.

Rainer Lienhart, "PLSA on Large Scale Image Databases", 2006-31, Dec. 2006, http://www.informatik.uni-augsburg.de/de/lehrstuehle/mmc/publications/reports/MMC11/TR2006-33.pdf.

\* cited by examiner

CONTENT GROUPING SYSTEMS AND METHODS

BACKGROUND OF THE INVENTION

The expansion of digital media, including print, audio, and video formats, into market spaces formerly dominated by print media can best be described as "explosive." Such rapid expansion provides a user with the capability to obtain voluminous information on a subject from a variety of digital sources such as the internet, e-books, e-zines, and e-papers. However, relevant media content is frequently mixed with irrelevant content such as advertising, unrelated information, and graphical elements, thereby making it difficult to extract the relevant media content.

BRIEF DESCRIPTION OF THE DRAWINGS

Advantages of one or more disclosed embodiments may become apparent upon reading the following detailed description and upon reference to the drawings in which.

DETAILED DESCRIPTION

Figure 1:
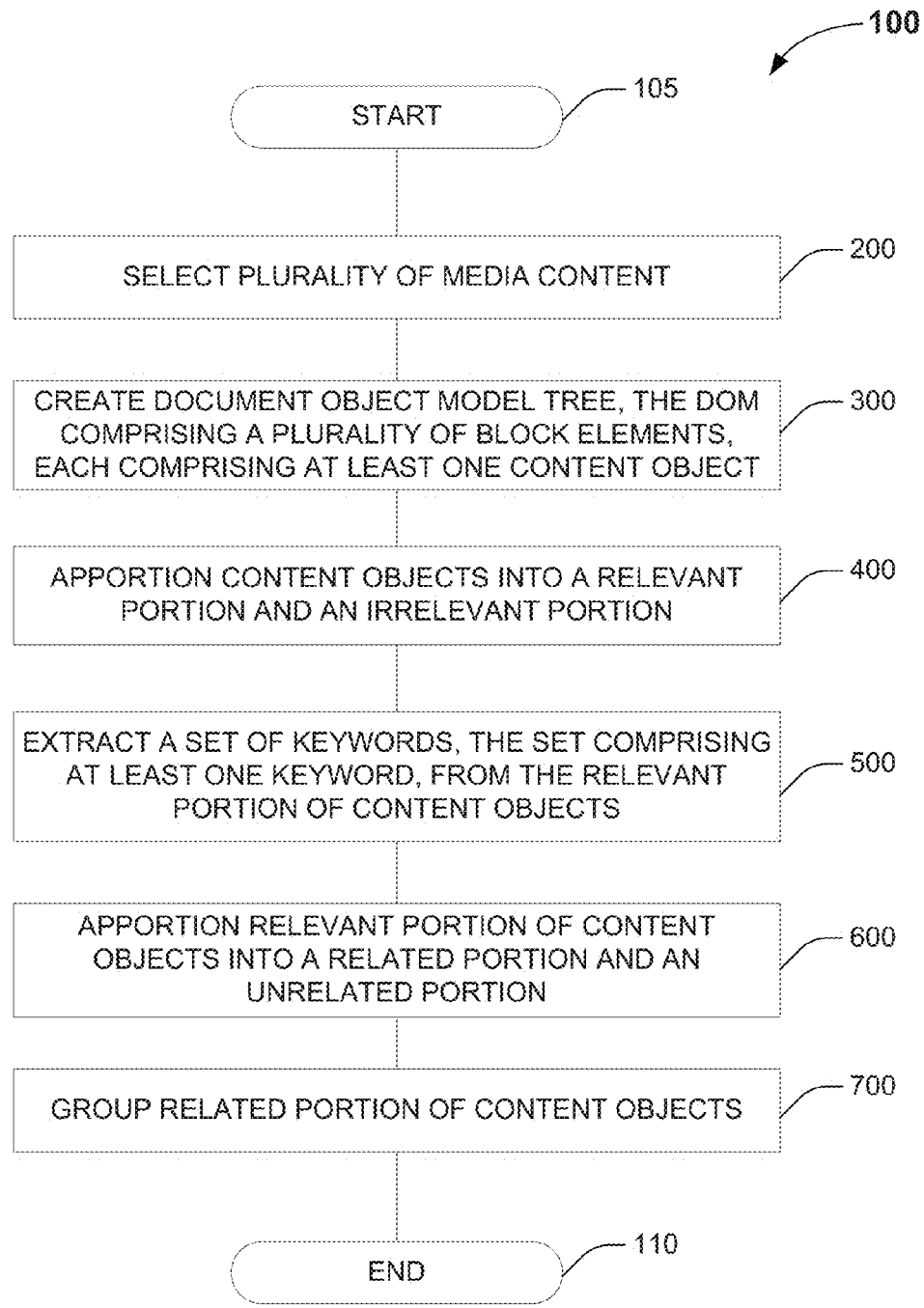
FIG. 1 is a flow diagram depicting an illustrative method for grouping content, according to one or more embodiments described herein.

A website is a complex array of information typically spanning multiple web pages, each having a different, though generally related, uniform resource locator ("URL"). Quite frequently, multiple web pages are connected or otherwise linked using hyperlinks that permit the user to rapidly navigate between the various pages comprising the website. Such website arrangements can permit the website owner to present information to viewers in an arrangement that is perceived to be most beneficial to the website owner, for example a hypothetical news story may be broken across two or three web pages, with each web page having a plethora of revenue generating hyperlinks and advertising disposed in and about the text comprising the news story. Such an arrangement may encourage visitor to the website to click on a revenue link, thereby providing income to the website owner.

A user may desire to extract the information in our hypothetical news story without distractions such as revenue generating hyperlinks, unrelated media, and formatting and other non-textual elements such as borders and headers. While it may be possible for the user to individually cut and paste the news story from the various web pages, such labor intensive, manual, compilation of information can rapidly expand from tedious for a news story spanning a few web pages, to onerous for a news story spanning tens or even hundreds of web pages.

A method of grouping a plurality of media content is provided. In some embodiments, a processor and communicatively coupled memory can convert at least a portion of the plurality of media content into at least one document object model ("DOM") comprising a plurality of block elements, each comprised of at least one content object. Each of the content objects can include at least a portion of the original plurality of media content. All or a portion of the content objects can be apportioned into a relevant portion and an irrelevant portion. A set of keywords, the set comprising at least one keyword, can be extracted from the relevant portion of content objects. Based upon the presence of at least a portion of the set of keywords, the relevant portion of the content objects can be apportioned into a related portion and an unrelated portion. The portion containing the related content objects can be grouped to provide grouped media content. The grouped media content can include the related, relevant content objects obtained from the original plurality of media content.

A system of grouping a plurality of media content is also provided. The system can include a processor and communicatively coupled memory. In some embodiments, the processor can be adapted convert at least a portion of the plurality of media content into at least one document object model ("DOM") comprising a plurality of block elements, each comprising at least one content object. The processor can be further adapted to apportion the content objects into a relevant portion, and an irrelevant portion. The processor can be further adapted to extract a set of keywords, the set comprising at least one keyword, from the content objects comprising the relevant portion of the content. Based upon the presence of all or a portion of the set of keywords, the processor can apportion the relevant portion of the content objects into a related portion and an unrelated portion. The processor can also group the related portion of the content to provide grouped media content. The grouped media content can include the related, relevant content objects obtained from the original plurality of media content.

A non-transitory computer readable medium is also provided. When executed on a processor, the computer readable medium can cause the processor to become a particular processor or machine suitable for executing a series of instructions to group media content. The computer readable medium can cause the processor to convert at least a portion of the media content into at least one document object model ("DOM") comprising a plurality of block elements, each comprising at least one content object. The computer readable medium can also cause the processor to apportion the content objects into a relevant portion, and an irrelevant portion. The computer readable medium can also cause the processor to determine a set of keywords, the set comprising at least one keyword, within content objects comprising the relevant portion of the content. The computer readable medium can, based upon the presence of at least a portion of set of keywords, cause the processor to apportion the relevant portion of the content objects into a related portion and an unrelated portion. The computer readable medium can also cause the processor to group the related portion of the content to provide grouped media content. The grouped media content can include the related, relevant content objects obtained from the original plurality of media content supplied by a user.

FIG. 1 is a flow diagram depicting an illustrative method 100 for grouping media content, according to one or more embodiments. In some embodiments, the method 100 can commence at 200 with the selection of a plurality of media content by the user. Such selection can, for example, occur when a user selects an article disposed on several web pages, with each web page having a plurality of media content in addition to the content of interest disposed thereupon. For example, consider an e-zine article disposed across several unique web pages, with each page containing textual and graphic advertisements related to the contents of the e-zine article. In some embodiments, such user selected media content can include one or more hypertext markup language ("HTML") documents.

The method 100 can continue at 300 with the creation of a document object model ("DOM"). The DOM can be a logical data structure representing the organization of the various elements disposed within the user selected media content. The DOM can include the Level 1 DOM, Level 2 DOM, and Level 3 DOM promulgated by the World Wide Web Consortium ("W3C"). The grouping technique disclosed herein however is also adaptable to future revisions to W3C's DOM protocol and any future revisions to the DOM protocol should be considered to be within the scope of one or more embodiments disclosed herein.

The DOM can comprise a plurality of block elements and content objects, attributes, or any combination of objects and attributes associated with the various texts, images, and formatting elements disposed on the web pages provided by the user at 100. In some embodiments, the creation of the DOM can permit a processor based analysis of the various texts, images, and formatting elements disposed on the web pages. The DOM can provide a set of functions enabling scripts to access browser elements such as windows and history. Additional functions allow updating of HTML style sheets and XML content.

In some embodiments, the DOM can convert the user supplied media content into a hierarchically arranged node tree resembling a database record. The node tree can permit the performance of various functionalities similar in nature to that performed on a conventional database. In some embodiments, such functionalities can include, but are not limited to: providing update capability, providing data exchange capabilities, and providing data analysis and filtering capabilities.

After creating the DOM for each of the user supplied web pages as a group of content objects, the method can continue at 400 by apportioning each of the content objects into a relevant portion and an irrelevant portion. For example, for a user supplied web page containing a news article and advertising, the advertising associated content objects can be allotted to, the irrelevant portion; while the text associated content objects and images having embedded or caption text associated content objects can be allotted to the relevant portion. Such gross apportionment into relevant and irrelevant portions can, in some embodiments, reduce the overall "noise" (i.e. unrelated or spurious information and keywords) produced during the future semantic analysis performed and described in greater detail in 500.

The processor can conduct one or more semantic analysis methods in 500 to extract a set of keywords from the content in the relevant portion of the content objects derived in 400. Although referred to as "keywords," the actual keywords can include single words, multi-word expressions, themes, or combinations thereof. The set of keywords determined in 500 can include at least one keyword, but can, in some embodiments, include multiple keywords such as a plurality of proper nouns. For example, multiple web pages related to a general topic such as "the first U.S. president" may return a single proper noun keyword, "George; Washington" whereas, multiple web pages related to a general topic such as "the founding fathers of the U.S." may return a plurality of proper noun keywords, including "George Washington," "John Adams," "Thomas Jefferson," "James Madison," and "Benjamin Franklin."

Any known or future analysis method can be employed in 500. For example, a Probabilistic Latent Semantic Analysis ("PLSA") and a Term Frequency-Inverse Document Frequency analysis ("TF-IDF") can be used to extract the most frequently used word, themes, or expressions within the content object sourced from the user supplied media content. In some embodiments, the analysis performed in 500 can provide a set of keywords, the set can include at least one keyword, theme, expression, or keyword string.

The set of keywords obtained from the relevant portion of the content objects in 500 can be used in 600 to determine which of the relevant content objects are related. In some embodiments, relevant content objects having a high degree of correlation with at least a portion of the keywords can be classified as "related," and relevant content objects having a low degree of correlation with at least a portion of the keywords can be classified as "unrelated." In 700, the related relevant content objects can be grouped to provide a focused presentation of the relevant content from the original media content.

As an illustrative example of the aforementioned method, consider an instance where a user supplies three independent HTML based websites, each having the following media content:

Website 1: Text article on "U.S. Presidents" containing captioned images of John Adams and John F. Kennedy, a text article on "Pets of the Presidents, multiple banner advertisements, and HTML formatting.

Website 2: Text article on "John Adams" containing captioned images of John Adams, a text article on "Visiting Massachusetts," multiple banner advertisements, and HTML formatting.

Website 3: Text article on "The Founding Fathers" containing captioned images of George Washington, Thomas Jefferson, John Adams, James Madison, and Benjamin Franklin, a text article on "Independence Hall," multiple banner advertisements, and HTML formatting.

In 300, each of the three web pages could be reduced to one or more DOM trees comprising content objects associated with each of the articles, images and captions, advertising, and formatting elements disposed on each web page.

In 400, the relevant content objects, including the content objects associated with each of the articles, images and captions could be apportioned into the relevant content object portion. The irrelevant content objects, including the content objects associated with each of the advertising, and formatting elements disposed on each web page could be apportioned into the irrelevant content object portion.

In 500, a semantic analysis could be performed to identify one or more keywords, themes, phrases, or concepts contained in the relevant portion of the content objects. For this example, the semantic analysis could identify "John Adams" as a keyword or phrase.

In 600, an analysis of the relevant content objects could be conducted to determine which of the relevant content objects has a significant degree of correlation with the keyword "John Adams." For the above example, the portions of the text article on "U.S. Presidents" on website #1 addressing John Adams could be deemed a "related" content object, while the remaining portions of the text article dealing with other U.S. Presidents could be deemed as "unrelated" content objects. Similarly, the John Adams image and caption text could be deemed as related content objects while the John F. Kennedy image and caption text could be deemed unrelated content objects.

In a like manner, the text article on "John Adams" on website #2 could be deemed a "related" content object, while the remaining text article dealing with other "Visiting Massachusetts" an could be deemed an unrelated content object.

Similarly, the portions of the text article on "The Founding Fathers" addressing John Adams could be deemed a "related" content object, while the remaining portions of the text article dealing with other founding fathers could be deemed unrelated content objects. In a like manner, the John Adams image and caption text could be deemed as related content objects while the images and caption text of George Washington, Thomas Jefferson, James Madison, and Benjamin Franklin could all be deemed unrelated content objects. Likewise, the text article on "Independence Hall" could be deemed an unrelated content object.

In 700 the related portions, all of which contain relevant content objects related to the keyword John Adams, can be grouped to provide a group of related content, all related to "John Adams."

Figure 2:
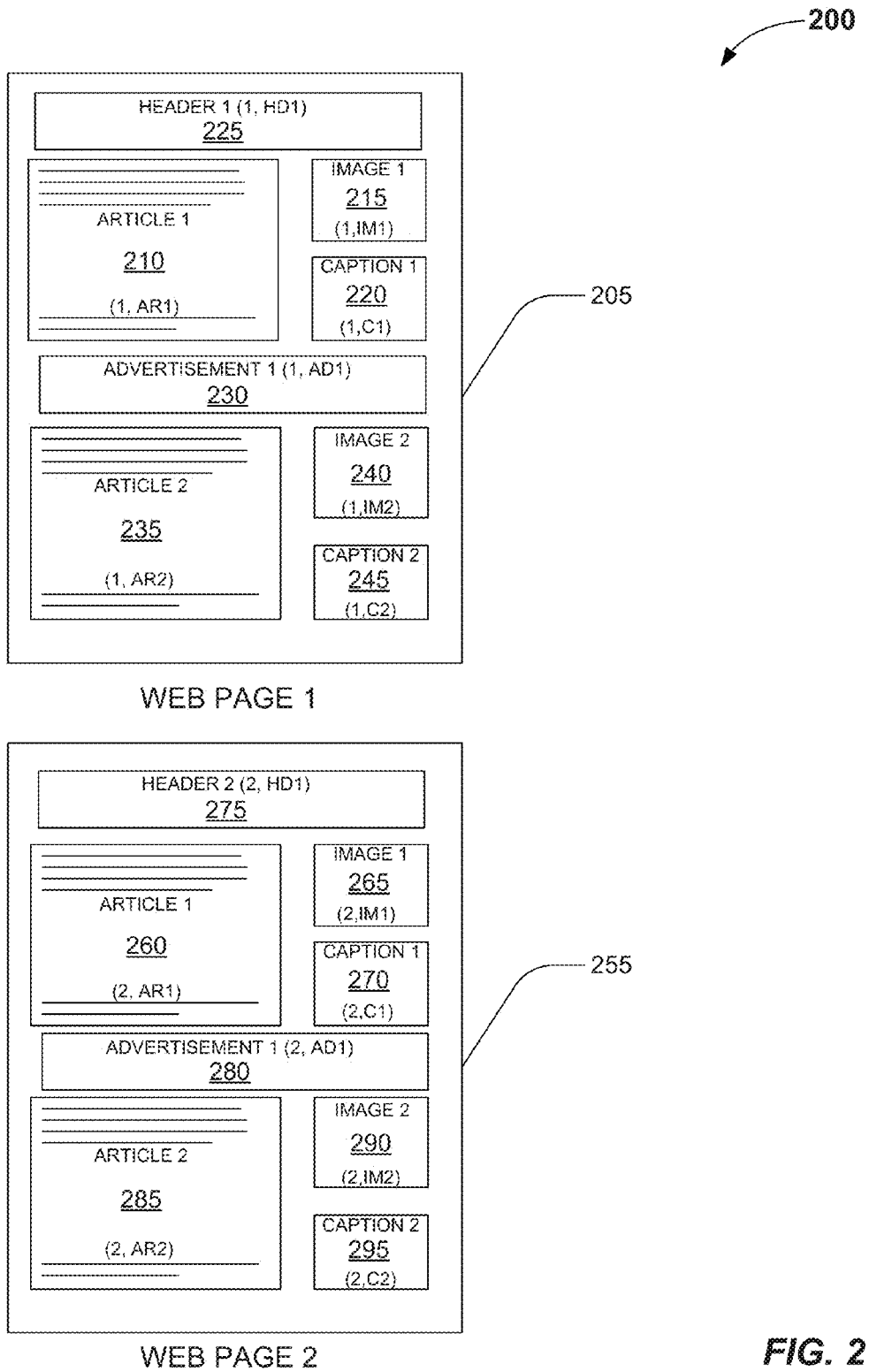
FIG. 2 is a schematic diagram depicting a plurality of media source samples, according to one or more embodiments described herein.

FIG. 2 is a schematic diagram depicting a plurality of media sources 205, 255, according to one or more embodiments. In some embodiments, the media sources 205, 255 can include a mixture of HTML objects including, but not limited to formatting elements such as headers 225 and 275, labeled respectively (1, HD1) and (2, HD1), et seq. In some embodiments, the media sources 205, 255 can include one or more advertisements 230, 280, labeled respectively (1, AD1) and (2, AD1), et seq. In some embodiments, the media sources 205, 255 can include one or more textual articles 210, 235, 260, and 285, labeled respectively (1, AR1), (1, AR2), (2, AR1) and (2, AR2), et seq. In some embodiments, the media sources 205, 255 can include one or more images 215, 240, 265, and 290, labeled respectively (1, IM1), (1, IM2), (2, IM1) and (2, IM2), et seq. In some embodiments, the media sources 205, 255 can include one or more image caption texts 220, 245, 270, and 295 labeled respectively (1, C1), (1, C2), (2, C1) and (2, C2), et seq., that are respectively related to and descriptive of images 215, 240, 265, and 290.

Figure 3:
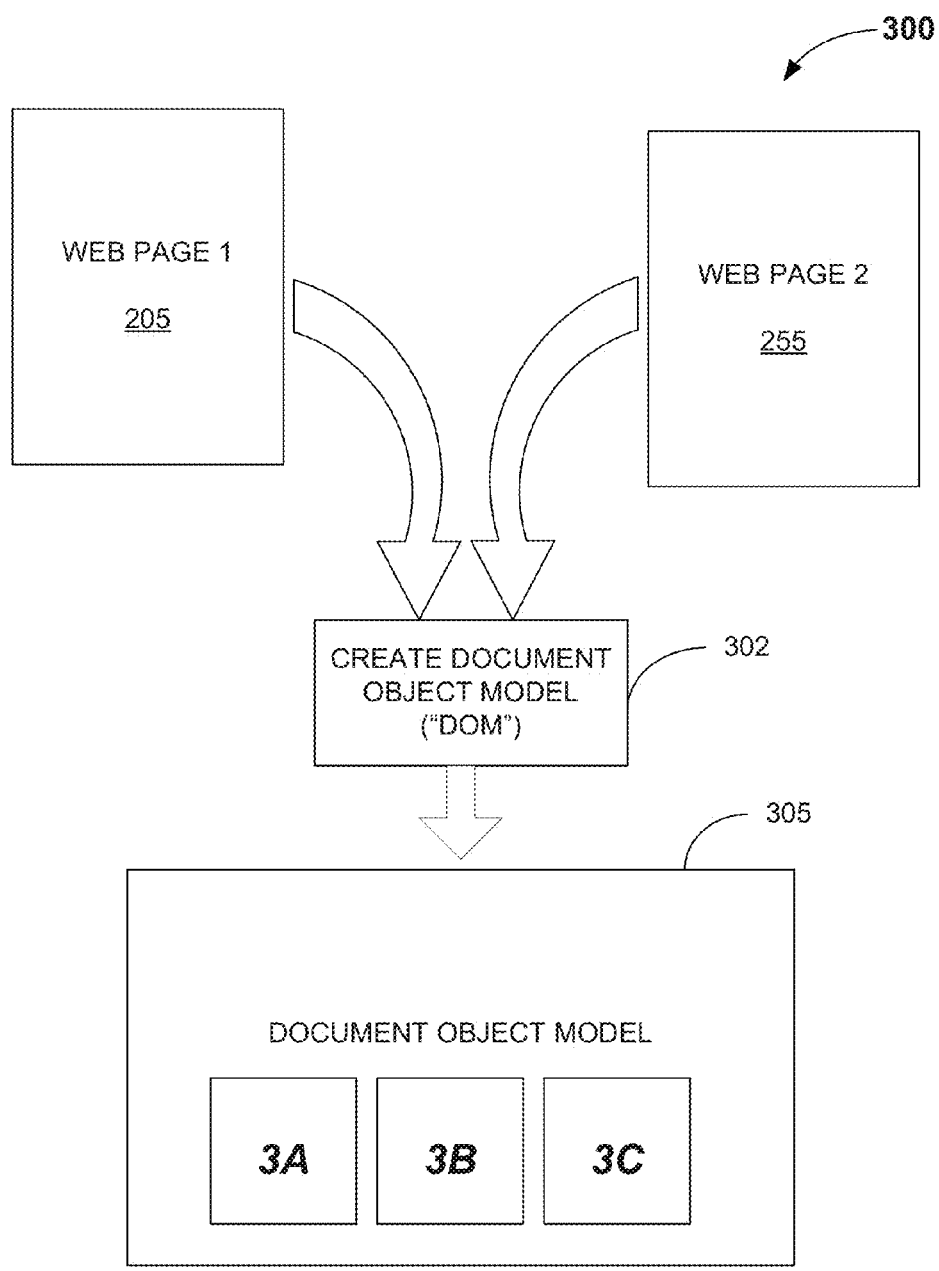
FIG. 3 is a schematic diagram depicting an illustrative creation a sample document object model ("DOM"), according to one or more embodiments described herein.

FIG. 3 is a schematic diagram depicting the creation 302 of a sample document object model ("DOM") 305, according to one or more embodiments. In some embodiments, the DOM 305 can be created 302 using a processor and a plurality of user selected media content, for example the first web page 205 and the second web page 255. In some embodiments, the DOM 305 can generated in whole or in part from the HTML media content disposed on all or a portion of the user supplied media content. In some embodiments, the DOM 305 can include: one or more textual content objects, described in greater detail with regards to FIG. 3A; one or more image elements along with associated caption text elements, described in greater detail with regards to FIG. 3B; and one or more formatting and advertising elements, described in greater detail with regards to FIG. 3C.

In some embodiments, the various HTML elements forming the user selected media can be broadly classified as comprising either a "block" element or a "style" element. In some embodiments, the block elements, i.e. those elements rendered into a content block on the web page, can include the following HTML tags: <div>, <p>, <br>, <li>, <ul>, <ol>, <td>, <tr>, <table>, <h1>, <h2>, <h3>, <h4>, <h5>, <h6>, and <hr>. In some embodiments, the style elements, i.e. those elements that affect the visual attributes of the elements displayed on the web page, can include the remaining HTML tags. In some embodiments, the HTML tags associated with a content object can provide an indication of the composition of the content object. The generation of the various content objects is described with greater specificity with regards to FIGS. 3A, 3B, and 3C.

Figure 3A:
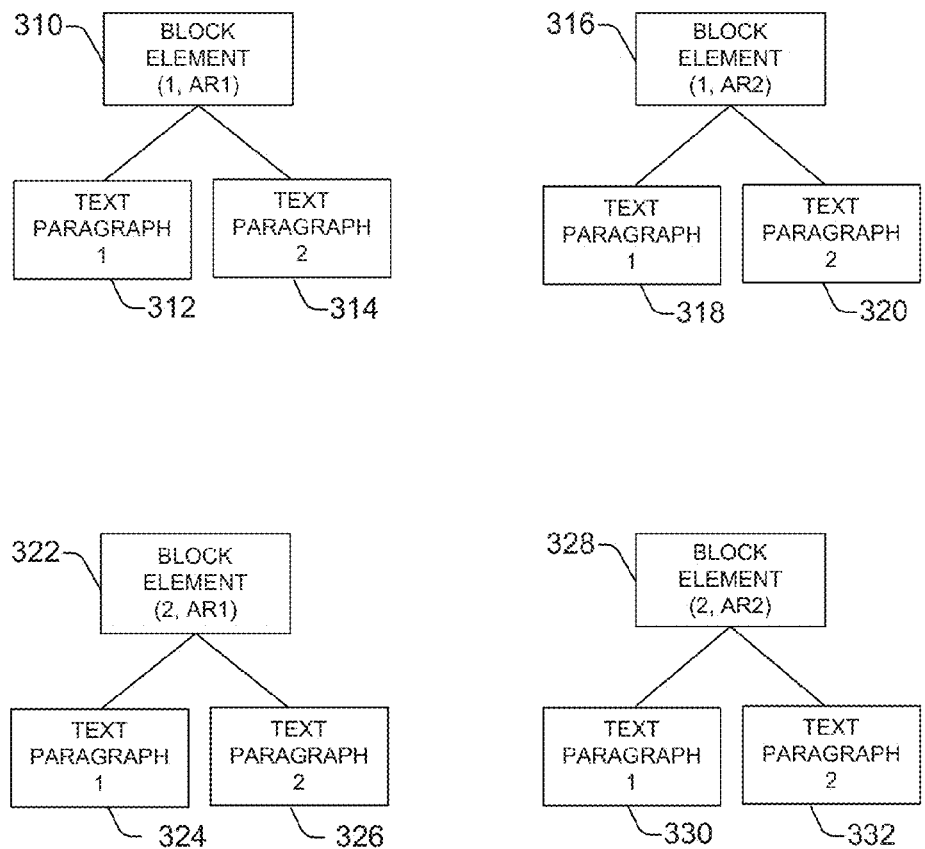
FIG. 3A is a schematic diagram depicting an illustrative DOM structure for textual elements, according to one or more embodiments described herein.

FIG. 3A is a schematic diagram depicting a sample DOM structure for one or more textual elements, according to one or more embodiments. In most circumstances, three HTML tags are generally employed to indicate the presence of one or more text containing elements, these tags include: <div> followed by text characters; <p> followed by text characters, and <br> interposed between text characters. The block element 310, a textual element associated with page 1, article 1, (1, AR1) can comprise a sub-tree of two paragraph content objects, 312 and 314. In a similar manner, the block element 316, a textual element associated with page 1, article 2, (1, AR2) can comprise a sub-tree of two paragraph content objects, 318, and 320. In a like manner, the block element 322, a textual element associated with page 2, article 1, (2, AR1) can comprise a sub-tree of two paragraph content objects, 324 and 326. In a like manner, the block element 328, a textual element associated with page 2, article 2, (2, AR2) can comprise a sub-tree of two paragraph content objects, 330, and 332.

Figure 3B:
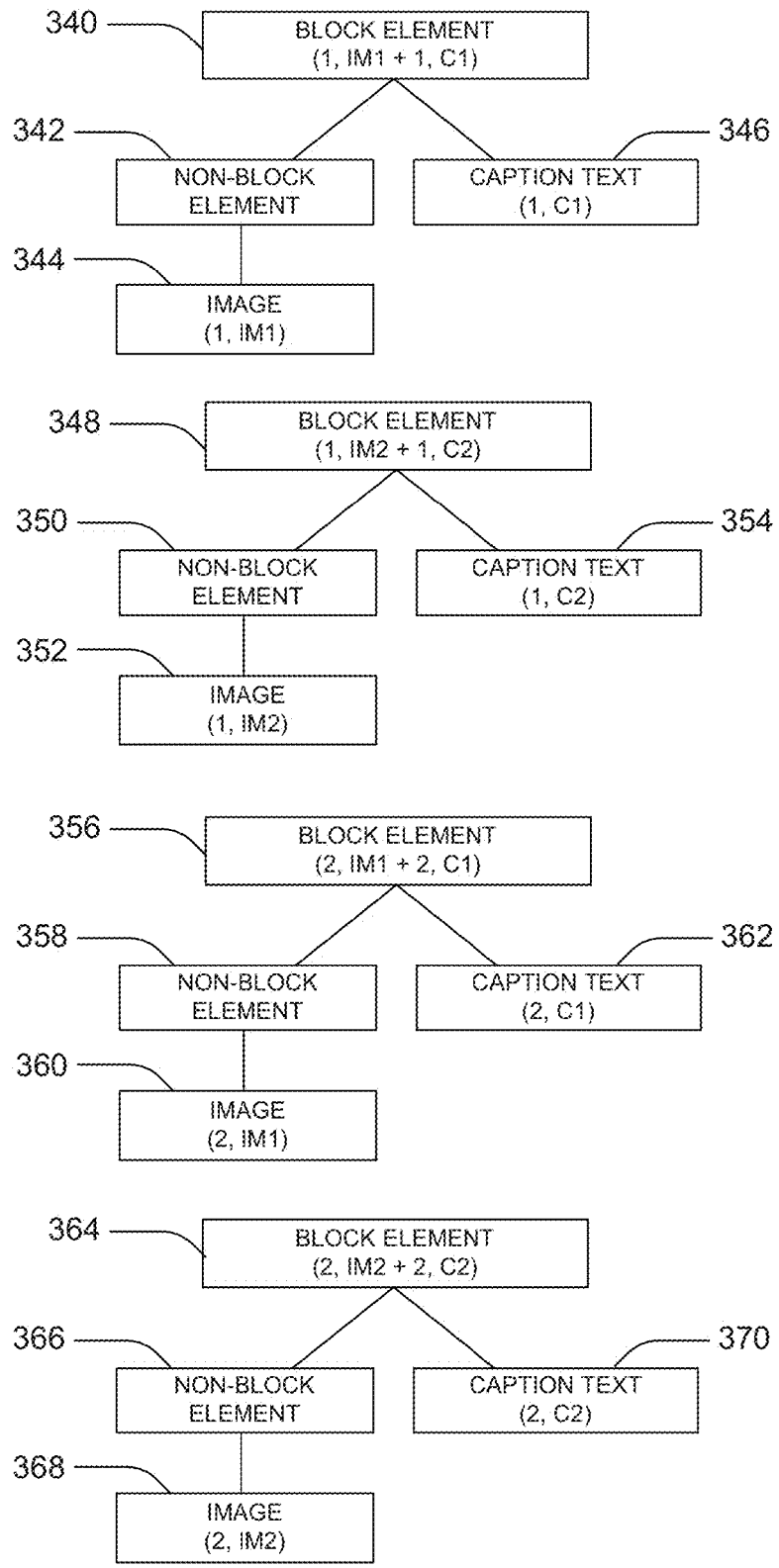
FIG. 3B is a schematic diagram depicting an illustrative DOM structure for image and caption text, according to one or more embodiments described herein.

FIG. 3B is a schematic diagram depicting a sample DOM structure for an image and caption text, according to one or more embodiments. The block element 340 can comprise image 1 (1, IM1) and the associated caption text (1, C1) displayed on the first user supplied media source 205. In some embodiments, the block element 340 can include a sub-tree comprising a non-block content object 342 containing image 1 (1,IM1) 344 and a text content object 346 containing the associated caption text (1,C1). The block element 348 can comprise image 2 (1, IM2) and the associated caption text (1, C2) displayed on the first user supplied media source 205. In some embodiments, the block element 348 can include a sub-tree comprising a non-block content object 350 containing image 2 (1, IM2) 352 and a text content object 354 containing the associated caption text (1, C2).

Similarly, the block element 356 can comprise image 1 (2, IM1) and the associated caption text (2, C1) displayed on the second user supplied media source 255. In some embodiments, the block element 356 can include a sub-tree comprising a non-block content object 358 containing image 1 (2, IM1) 360 and a text content object 362 containing the associated caption text (1, C2). The block element 364 can comprise image 2 (2, IM2) and the associated caption text (2, C2) displayed on the second user supplied media source 255. In some embodiments, the block element 364 can include a sub-tree comprising a non-block content object 366 containing image 2 (2, IM2) 368 and a text content object 370 containing the associated caption text (2, C2).

Figure 3C:
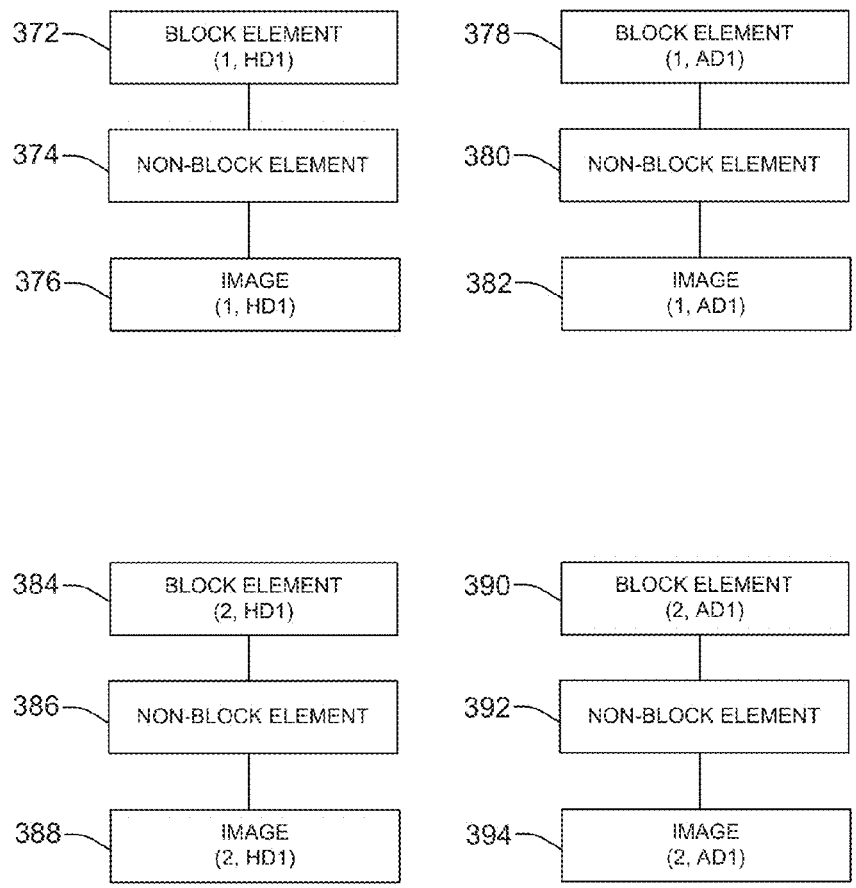
FIG. 3C is a schematic diagram depicting an illustrative DOM structure for advertising and formatting elements, according to one or more embodiments described herein.

FIG. 3C is a schematic diagram depicting a sample DOM structure for advertising 230, 280 and formatting elements 225, 275, according to one or more embodiments. In some embodiments, block element 372, associated with the header (1, HD1) displayed on the first user supplied media source 205, can include a sub-tree comprising a non-block content object 374 including an image 376. In some embodiments, the block element 384, associated with the page 2 header (2, HD1) displayed on the second user supplied media source 255, can include a sub-tree comprising a non-block content object 386 including an image 388.

Similarly, in some embodiments, block element 378, associated with the advertisement (1, AD1) displayed on the first user supplied media source 205, can include a sub-tree comprising a non-block content object 380 including an image 382. In some embodiments, block element 390, associated with the page 2 advertisement (2, AD1 displayed on the second user supplied media source 255, can include a sub-tree comprising a non-block content object 392 including an image 394.

Figure 4:
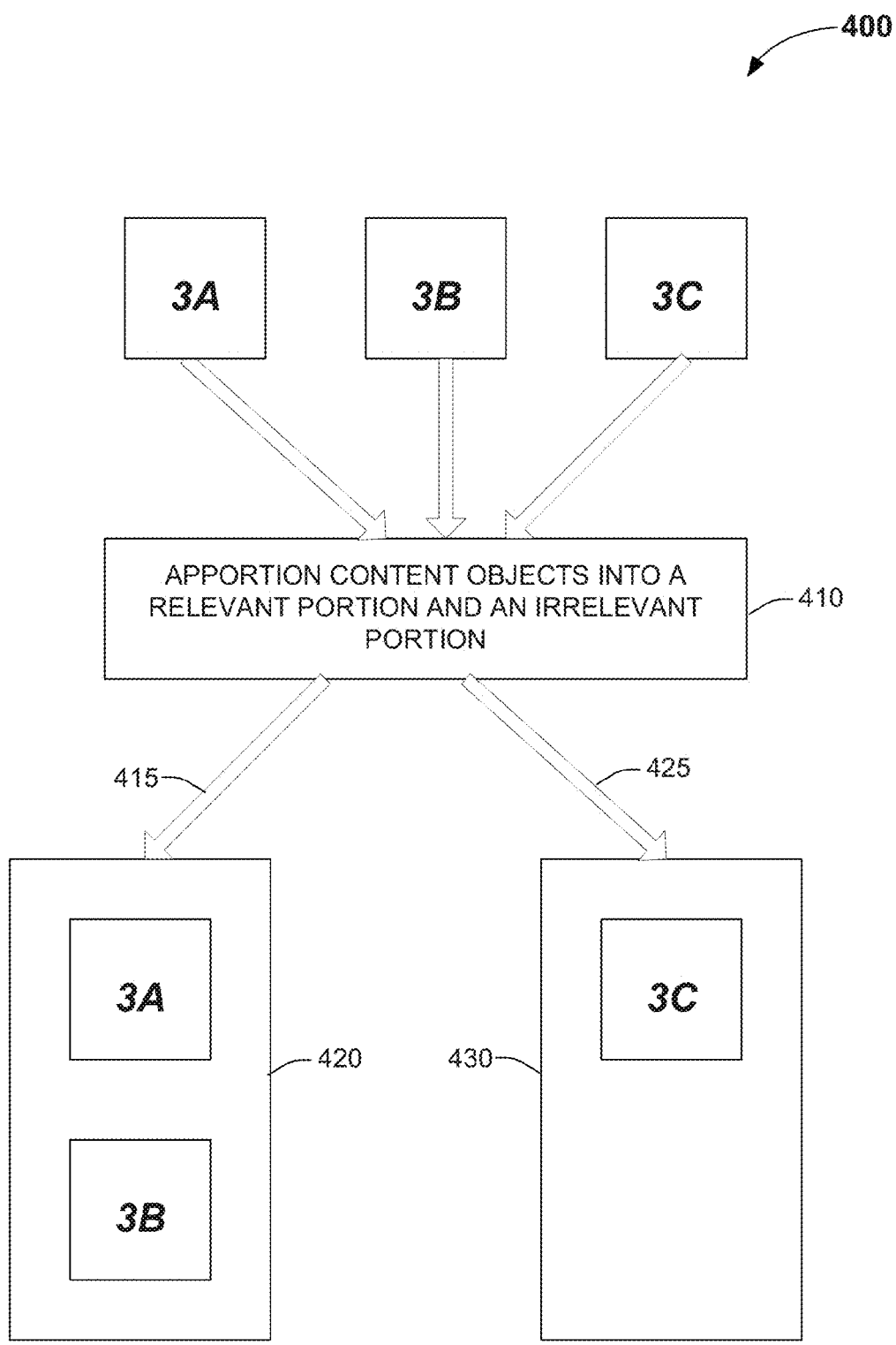
FIG. 4 is a schematic diagram depicting the illustrative apportionment a plurality of content objects into a relevant portion and an irrelevant portion, according to one or more embodiments described herein.

FIG. 4 is a schematic diagram depicting the apportionment 410 of the plurality of content objects from FIGS. 3A-3C into a relevant portion 420 and an irrelevant portion 430, according to one or more embodiments. Generally, the apportionment 410 of the content objects depicted in FIGS. 3A-3C into a relevant and an irrelevant portion can simplify the subsequent handling of the content objects by eliminating the "noise" component from the user supplied media content 200 prior to performing the keyword extraction in 500.

In some embodiments, the apportionment into the relevant portion 420 or the irrelevant portion 430 can be based, in whole or in part, upon the nature, composition, or classification of each of the content objects. In some embodiments, all textual content objects might be considered relevant. In some embodiments, the number of text characters comprising the textual content objects can be used to ascertain, evaluate, or otherwise determine the degree of relevancy of the content object. The number of characters comprising a textual content object can be useful, for example, in distinguishing advertising from articles since a textual content object containing advertising will generally contain fewer characters than a content object containing an article.

For example, in some embodiments, the processor executing the method can total number of characters within each textual content object. Textual content objects having a number of characters equaling or exceeding a predetermined threshold can be allotted 415 to the relevant portion 420. Textual content objects having a number of characters less than the predetermined threshold can be allotted 425 to the irrelevant portion 430. In some embodiments, the predetermined threshold can be about 500 characters or more; about 1,000 characters or more, about 2,000 characters or more, or about 3,000 characters or more.

Of the block elements 310, 316, 322, 328, 340, 348, 356, 364, 372, 378, 384, and 390 depicted in FIGS. 3A-3C, only those having sub-trees associated with articles or captioned images contain text elements. Thus, the apportionment into the relevant portion 420 and the irrelevant portion 430 can be accomplished in a relatively straightforward manner, with block elements having no associated text (i.e. block elements 372, 378, 384, and 390) allocated into the irrelevant portion 430 while the remaining block elements (i.e., 310, 316, 322, 328, 340, 348, 356, and 364), all of which have one or more textual elements in their associated sub-tree, can be allocated to the relevant portion 420. Where a predetermined threshold is applied, the block elements having no associated text might be allocated to the irrelevant portion 430 based upon their failure to meet the predetermined threshold for the minimum number of characters required for inclusion within the relevant portion 420.

Figure 5:
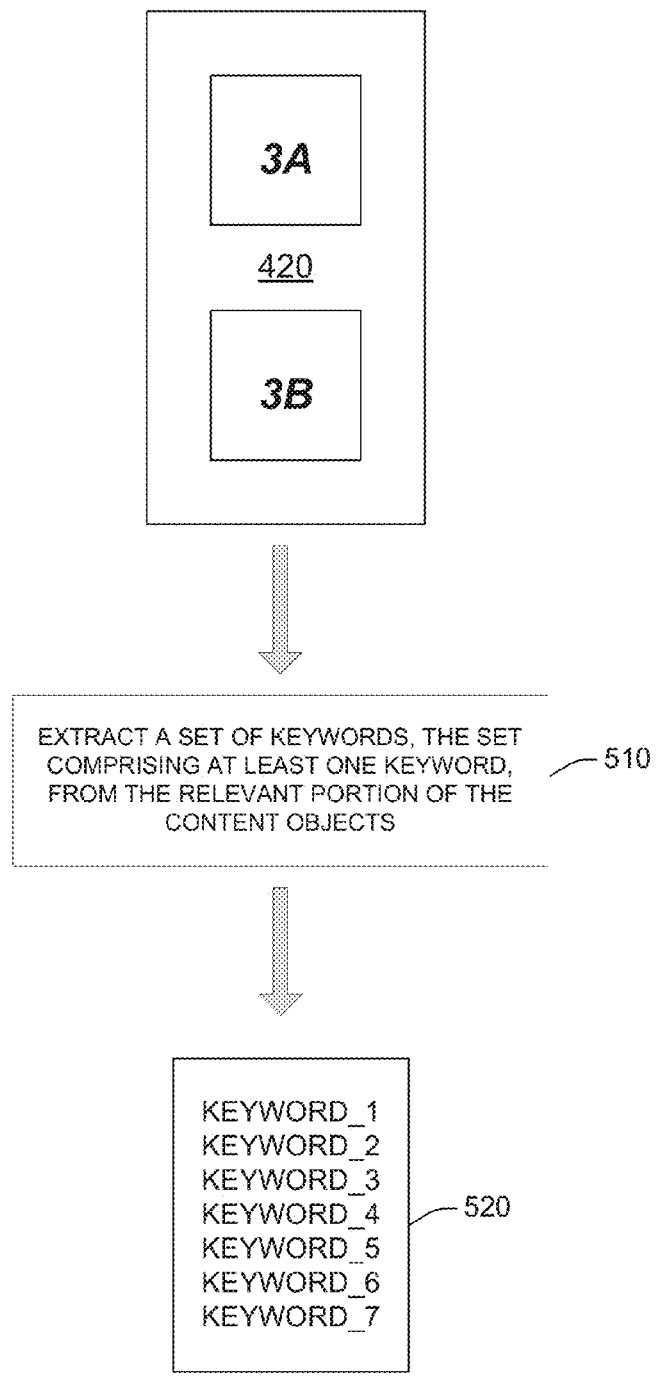
FIG. 5 is a schematic diagram depicting the illustrative determination of a keyword set from the relevant portion of the content objects, according to one or more embodiments described herein.

FIG. 5 is a schematic diagram depicting the determination 510 of a keyword set 520 from the relevant portion 420 of the content objects, according to one or more embodiments. In some embodiments, the determination of a keyword set can be performed by inputting a plurality of text segments, for example the relevant textual content objects determined in 400, to a processor that outputs a set of keywords describing the contents of the plurality of input text segments. The determination 510 of the keyword set 520 can be performed using any method or combination of methods such as term frequency, term frequency-inverse document frequency analysis ("TF-IDF") and topic modeling. In some embodiments, the topic modeling approach can be based in whole or in part on probabilistic latent semantic analysis ("PLSA").

In some embodiments, the determination 510 of the keyword set 520 can be performed using PLSA based upon one or more user supplied semantic concepts. In some embodiments, the user supplied semantic concepts can include concepts tailored to specific tasks. For example, the user supplied semantic concept of "the founding fathers" may include user defined proper nouns such as "George Washington," "John Adams," "Thomas Jefferson," "James Madison," and "Benjamin Franklin."

In some embodiments, the keyword set 520 can be based in whole or in part upon a straight frequency distribution within the user supplied media content 205, 255. For example, the keyword set 520 may include one or more proper nouns based upon the frequency of appearance of the specific proper noun in the user supplied media content 205, 255. In some embodiments, the determination 510 of the keyword set 520 can be performed by a processor using an algorithm that first performs a Named Entity Recognition ("NRE") to extract proper nouns from the relevant content objects 520.

Figure 6:
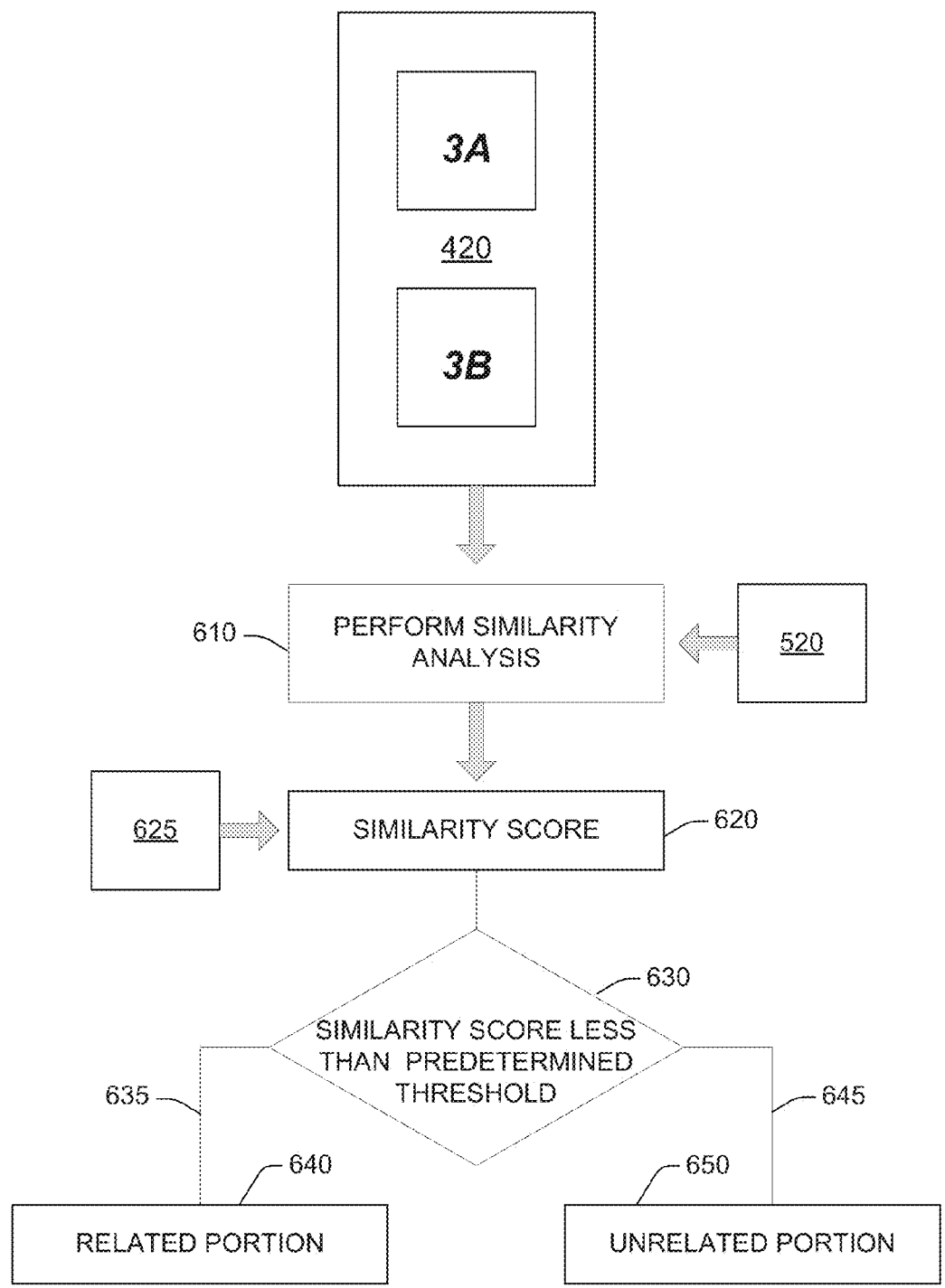
FIG. 6 is a schematic diagram depicting the performance of an illustrative similarity analysis on the relevant content objects, according to one or more embodiments described herein.

FIG. 6 is a schematic diagram depicting the performance 610 of an illustrative similarity analysis on the relevant content objects 420, according to one or more embodiments. After determining the set of keywords 520, the processor can perform 610 a similarity analysis on at least a portion of the relevant content objects 420. In some embodiments, the degree of correlation between the set of keywords 520 and each of the relevant content objects 420 as determined by the similarity analysis can be expressed as a similarity score 620. The processor can, in some embodiments, compare the similarity score to a predetermined threshold 630 to determine whether each of the relevant content objects 420 should be allocated to the related content object portion 640 or the unrelated content object portion 650. In some embodiments, where the similarity score is at least equal to the predetermined threshold, the relevant content object can be allotted 635 to the related portion. In some embodiments, where the similarity score is less than the predetermined threshold, the relevant content object can be allotted 645 to the unrelated portion.

In some embodiments, after performing the NRE, the algorithm can perform the similarity analysis 610 by comparing the extracted patterns of proper nouns from any two relevant content objects 420 to determine whether similar content appears within the objects. In some embodiments, this comparison can include textual elements and caption text elements. In some embodiments, after performing the similarity analysis 610, the algorithm can construct multi-dimensional term vectors based upon the relative frequency of each of the keywords comprising the set of keywords 520. In some embodiments, multi-dimensional tern vectors can be normalized into a multi-dimensional space where the number of dimensions equals the number of extracted keywords. The algorithm can then derive a cosine similarity based upon the normalized frequency distributions of two textual content objects. In some embodiments, the cosine similarity can represent the angle between the normalized frequency distribution vectors—orthogonal vectors having a similarity of "0" would indicate no similarity between the two textual elements, where orthogonal vectors having a similarity of "1" would indicate complete or perfect similarity between the two textual elements. In such an instance, the similarity score could be proportional to the angle between the normalized frequency distribution vectors.

In some embodiments, a similarity score can be allocated to each content object using any system or method of associating at least a portion of the set of keywords with each of the content objects. For example, a content object could receive one "point" for each occurrence of a keyword within the content object. In such an instance, the similarity score could be the sum of the "points" accumulated by a content object. Such frequency distribution is but one illustrative method of many for calculating a similarity score 620 for all or a portion of the relevant content objects 420.

Figure 6A:
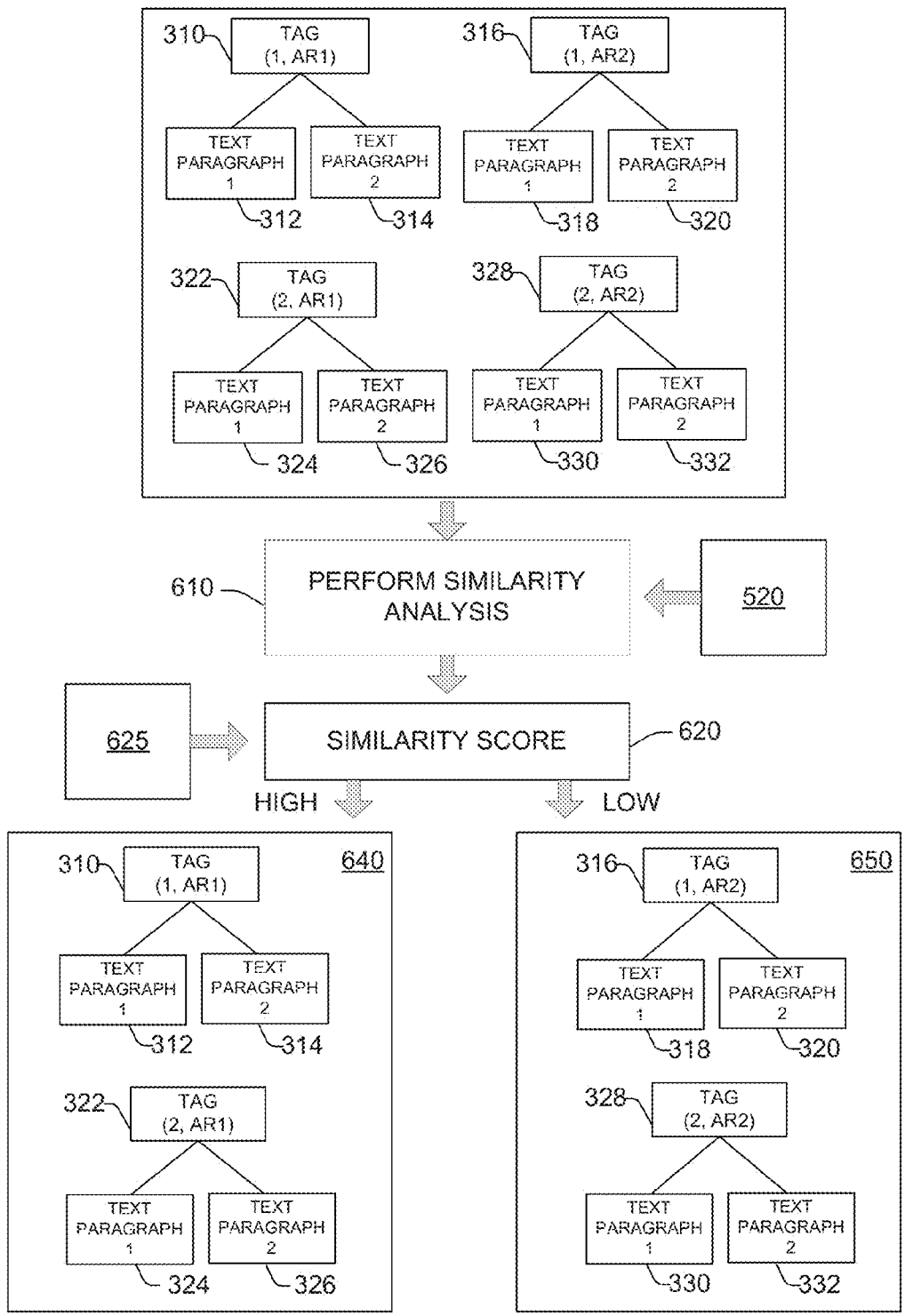
FIG. 6A is a schematic diagram depicting the performance of an illustrative similarity analysis on a portion of the relevant content objects depicted in FIG. 3A, according to one or more embodiments described herein.
Figure 6B:
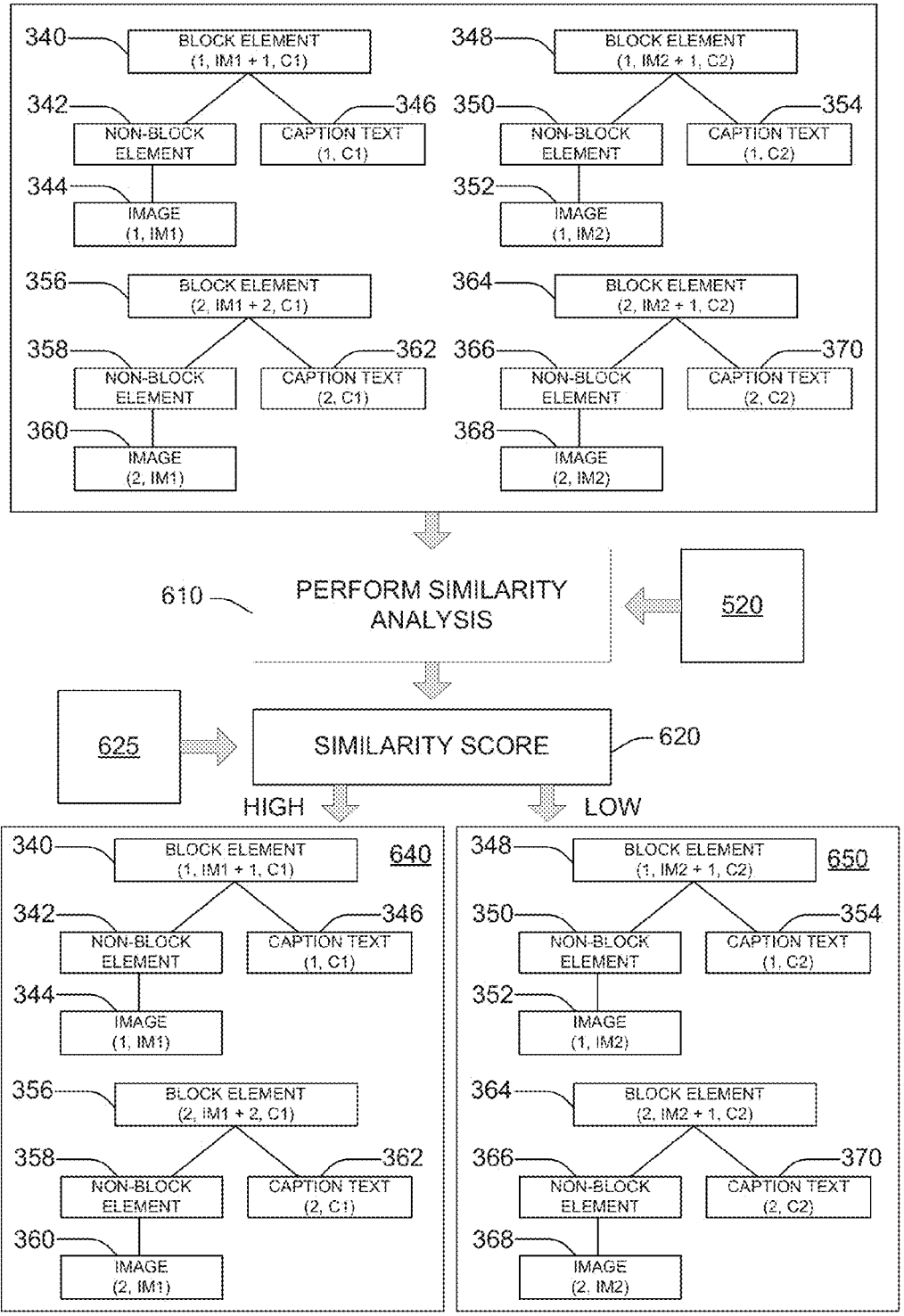
FIG. 6B is a schematic diagram depicting the performance of an illustrative similarity analysis on a portion of the relevant content objects depicted in FIG. 3B, according to one or more embodiments described herein.

FIG. 6A is a schematic diagram depicting the performance of an illustrative similarity analysis 610 on a portion of the relevant content objects 420 depicted in FIG. 3A, according to one or more embodiments. FIG. 6B is a schematic diagram depicting the performance of an illustrative similarity analysis 610 on a portion of the relevant content objects 420 depicted in FIG. 3B, according to one or more embodiments. In some embodiments, the similarity analysis 610 can be performed by a processor, comparing all or a portion of the set of keywords 520 with at least a portion of the relevant content objects 420.

In the illustrative example depicted in FIG. 6A, the textual content objects associated with block elements 310, 316, 322, and 328 can be compared with the set of keywords 520 when the processor performs the similarity analysis 610. The comparison between the textual content objects and the set of keywords 520 can result in a similarity score 620 associated with each of the textual content objects. A relevant content object having a similarity score that at least equals a predetermined threshold 625 can be allotted to the related content object portion 640, whereas a relevant content object having a similarity score less than the predetermined threshold 625 can be allotted to the unrelated content object portion 650.

As depicted in the example shown in FIG. 6A, article 1 on page 1 (1, AR1) of the used supplied media content 205 and article 1 on page 2 (2, AR1) of the user supplied media content 255 have similarity scores exceeding the predetermined threshold 625 and are allotted to the related content object portion 640. Article 2 on page 1 (1, AR2) and article 2 on page 2 (2, AR2) of the user supplied media content 255 have similarity scores less than the predetermined threshold 625 and are allotted to the unrelated content object portion 650.

Similarly, in the illustrative example depicted in FIG. 6B, the caption text content objects associated with block elements 340, 348, 356, and 364 can be compared with the set of keywords 520 when the processor performs the similarity analysis 610. The comparison between the caption text content objects and the set of keywords 520 can result in a similarity score 620 associated with each of the caption text content objects. A relevant content object having a similarity score that at least equals a predetermined threshold 625 can be allotted to the related content object portion 640, whereas a relevant content object having a similarity score less than the predetermined threshold 625 can be allotted to the unrelated content object portion 650.

As depicted in the example shown in FIG. 6B, caption text 1 on page 1 (1, C1) and the associated image (1, IM1) contained in user supplied media content 205 and caption text 1 on page 2 (2, C1) and the associated image (2, IM1) contained in user supplied media content 255 can have similarity scores exceeding the predetermined threshold 625 and are allotted to the related content object portion 640. Note that the linkage of the caption text to the image via the block element (e.g. caption text 1 on page 1 (1, C1) is linked to image 1 on page 1 (1, IM1) via the block element 340) can serve to allot both the caption text and the associated image into the related content object portion 640.

Caption text 2 on page 1 (1, C2) and the associated image (1, IM2) contained in user supplied media content 205 and caption text 2 on page 2 (2, C2) and the associated image (2, IM2) contained in user supplied media content 255 can have similarity scores less than the predetermined threshold 625 and are allotted to the unrelated content object portion 650. Again note the linkage of the caption text to the image via the block element (e.g. caption text 2 on page 1 (1, C2) is linked to image 2 on page 1 (1, IM2) via the block element 348) can serve to allot both the caption text and the associated image into the unrelated content object portion 650.

Figure 7:
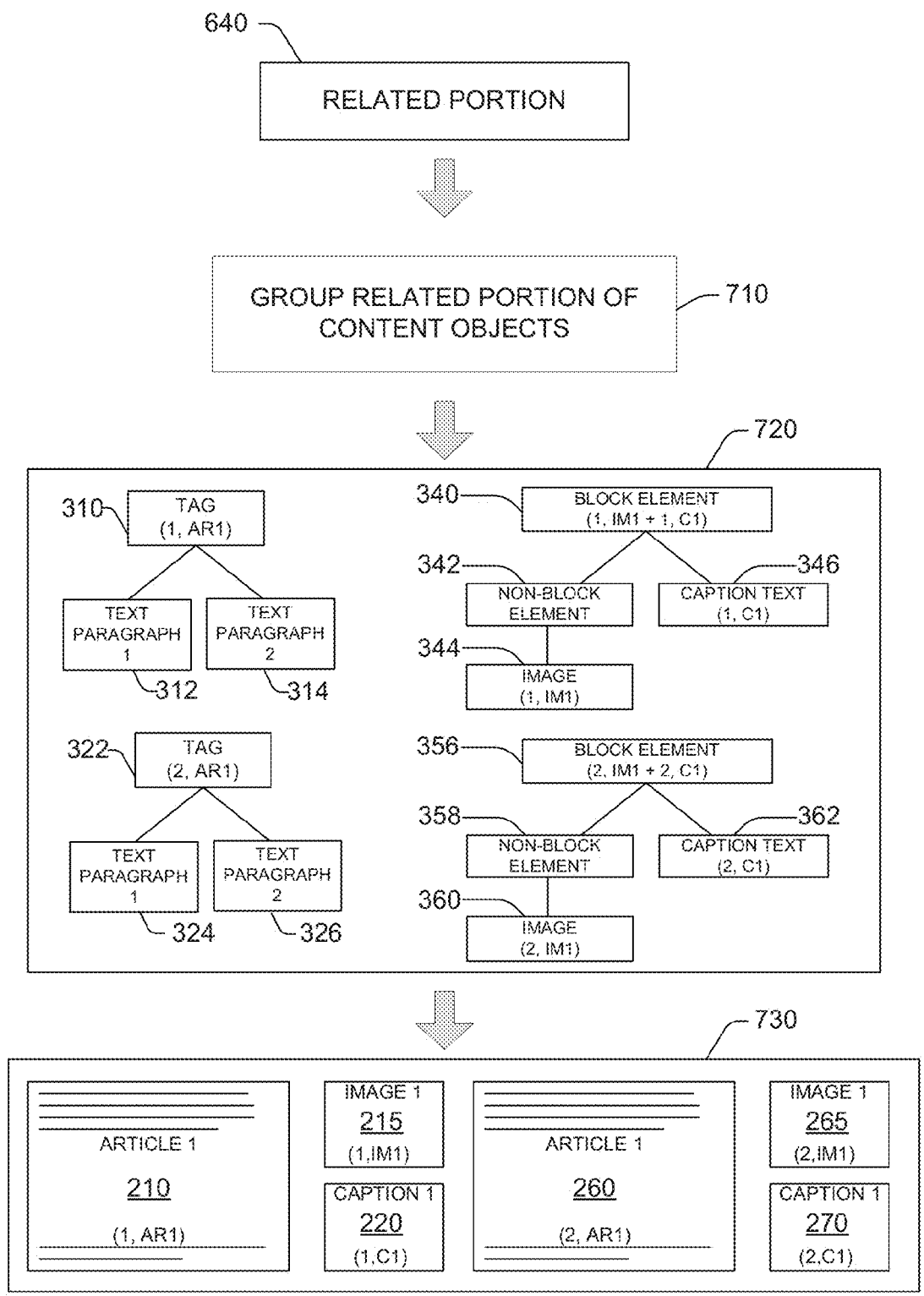
FIG. 7 is a schematic diagram depicting an illustrative grouping of related content objects, according to one or more embodiments described herein.

FIG. 7 is a schematic diagram depicting an illustrative grouping 710 of related content objects 640, according to one or more embodiments. In some embodiments, the processor can logically group or otherwise arrange 720 all or a portion of the related content objects in the related content objects portion 640. In some embodiments, the logical grouping of all or a portion of the related content objects can permit the grouping of the portions the original user supplied media content 205, 255 into a logically grouped user supplied media content 730.

Such a grouping may be useful, for example, when a user desires to extract information on a single topic or theme from multiple HTML sources, some or all of which may contain advertising, formatting, and other media content that is undesirable in the user's final work product.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

While the foregoing is directed to embodiments of the present invention, other and further embodiments of the invention may be devised without departing from the basic scope thereof, and the scope thereof is determined by the claims that follow.

What is claimed is:

1. A method of grouping a plurality of media content, comprising:
    using a processor and communicatively coupled memory, converting at least a portion of the plurality of media content into at least one document object model ("DOM") comprising a plurality of block elements, each comprising at least one content object;
    apportioning the content objects into a relevant portion and an irrelevant portion;

extracting a set of keywords from the relevant portion of the content objects, wherein the set comprises at least one keyword;

apportioning the relevant portion of the content objects into a related portion and an unrelated portion using at least a portion of the set of keywords;

calculating a similarity score for each of the content objects, wherein calculating the similarity score comprises: constructing at least one multi-dimensional vector based on a relative frequency of appearance of at least a portion of the set of keywords within each content object normalizing the at least one multi-dimensional vector, mapping the at least one normalized multi-dimensional vector into a multi-dimensional space, and deriving a cosine similarity measure based upon the normalized frequency distribution between each of the content objects; and grouping the related portion of the content to provide a group of related content.

2. The method of claim 1, wherein apportioning the content objects comprises:

extracting content objects comprising text, images, and caption text from the plurality of block elements;

allotting each of the textual content objects having a number of text characters less than a predetermined threshold into the irrelevant portion and each of the textual content objects having a number of text characters greater than or equal to a predetermined threshold into the relevant portion; and allotting each of the image and caption text content objects into the relevant portion.

3. The method of claim 2, wherein the predetermined threshold is in a range from 500 characters to 2,000 characters.

4. The method of claim 1, wherein extracting the set of keywords from the relevant content objects comprises application of an extraction technique selected from the group of extraction techniques consisting of:

a proper noun extraction, a term frequency analysis, a probabilistic latent semantic analysis ("PLSA") and a term frequency-inverse document frequency analysis ("TF-IDF").

5. The method of claim 1, wherein the apportioning the relevant portion of the content objects into a related portion and an unrelated portion comprises:

performing a similarity evaluation using at least a portion of the set of keywords and at least a portion of the relevant content objects, wherein the similarity evaluation comprises:

calculating a similarity score for each of the content objects, the similarity score proportionate to the frequency of appearance of at least a portion of the set of keywords within the content object;

allotting the relevant content objects having a similarity score at least equal to a predetermined threshold into the related portion; and allotting the relevant content objects having a similarity score less than a predetermined threshold into the unrelated portion.

6. A system of grouping a plurality of media content, comprising:

a processor and communicatively coupled memory to:

convert at least a portion of the plurality of media content into at least one document object model ("DOM") comprising a plurality of block elements, each comprising at least one content object;

apportion the content objects into an relevant portion, and an irrelevant portion;

extract a set of keywords within the relevant portion of content objects, the set comprising at least one keyword;

apportion the relevant portion of content objects into a related portion and a unrelated portion using at least a portion of the set of keywords;

calculate a similarity score for each of the content objects, wherein calculating the similarity score comprises: constructing at least one multi-dimensional vector based on a relative frequency of appearance of at least a portion of the set of keywords within each content object, normalizing the at least one multi-dimensional vector, mapping the at least one normalized multi-dimensional vector into a multi-dimensional space, and deriving a cosine similarity measure based upon the normalized frequency distribution between each of the content objects; and group the related portion of the content objects to provide a group of related content.

7. The system of claim 6, wherein the apportionment of the content objects into relevant and irrelevant portions comprises a processor to:

extract content objects comprising text, images, and associated caption text from the plurality of content objects;

allot each of the textual content objects having a number of text characters less than a predetermined threshold into the irrelevant portion and each of the textual content objects having a number of text characters greater than or equal to a predetermined threshold into the relevant portion; and allot each of the image and associated caption text content objects into the relevant portion.

8. The system of claim 6, wherein the extraction of the set of keywords comprises a processor to execute an extraction technique selected from the group of extraction techniques consisting of:

a proper noun extraction, a term frequency analysis, a probabilistic latent semantic analysis ("PLSA") and a term frequency-inverse document frequency analysis ("TF-IDF").

9. The system of claim 6, wherein the apportionment of the relevant portion of the content objects into a related portion and an unrelated portion comprises a processor to:

perform a similarity evaluation using at least a portion of the set of keywords and at least a portion of the relevant content objects, wherein the similarity evaluation comprises a processor adapted to:

calculate a similarity score for each of the relevant content objects, the similarity score proportionate to the frequency of appearance of at least a portion of the set of keywords within the content object;

allot the relevant content objects having a similarity score at least equal to a predetermined threshold into the related portion; and allot the relevant content objects having a similarity score less than a predetermined threshold into the unrelated portion.

10. A non-transitory computer readable medium which, when executed on a processor, causes the processor to execute a series of instructions to group media content comprising:

convert at least a portion of the media content into at least one document object model ("DOM") comprising a plurality of block elements, each comprising at least one content object;

apportion the content objects into a relevant portion and an irrelevant portion;

extract a set of keywords within the relevant portion of content objects, the set comprising at least one keyword;

apportion the relevant portion of the content objects into a related portion and an unrelated portion using at least a portion of the set of keywords;

calculate a similarity score for each of the content objects, wherein to calculate the similarity score comprises: to construct at least one multi-dimensional vector based on a relative frequency of appearance of at least a portion of the set of keywords within each content object, normalizing the at least one multi-dimensional vector, mapping the at least one normalized multi-dimensional vector into a multi-dimensional space, and deriving a cosine similarity measure based upon the normalized frequency distribution between each of the content objects; and group the related portion of the content objects to provide a group of related content.

11. The non-transitory computer readable medium of claim 10, wherein the apportionment of the content objects causes the processor to execute a series of instructions comprising:

extracting content objects comprising text, images, and associated caption text from the plurality of content objects;

apportion each of the textual content objects having a number of text characters greater than or equal to a predetermined threshold into the relevant portion and each of the textual content objects having a number of text characters less than a predetermined threshold into the irrelevant portion; and apportioning each of the image and associated caption text content objects into the relevant portion.

12. The non-transitory computer readable medium of claim 10, wherein the extraction of the set of keywords causes the processor to execute a series of instructions comprising executing an extraction technique selected from the group of extraction techniques consisting of:

a proper noun extraction, a term frequency analysis, a probabilistic latent semantic analysis ("PLSA") and a term frequency-inverse document frequency analysis ("TF-IDF").

13. The non-transitory computer readable medium of claim 10, wherein the apportioning the relevant portion of the content objects into a related portion and an unrelated portion causes the processor to execute a series of instructions comprising:

performing a similarity evaluation using at least a portion of the set of keywords and at least a portion of the content objects, wherein the similarity evaluation comprises:

calculating a similarity score for each of the content objects, the similarity score proportionate to the frequency of appearance of at least a portion of the set of keywords within the content object;

allotting the relevant content objects having a similarity score at least equal to a predetermined threshold into the related portion; and allotting the relevant content objects having a similarity score less than a predetermined threshold into the unrelated portion.

\* \* \* \* \*

UNITED STATES PATENT AND TRADEMARK OFFICE
CERTIFICATE OF CORRECTION

| | |
|---|---|
| PATENT NO. | : 8,577,887 B2 |
| APPLICATION NO. | : 12/639768 |
| DATED | : November 5, 2013 |
| INVENTOR(S) | : Joshi et al. |

It is certified that error appears in the above-identified patent and that said Letters Patent is hereby corrected as shown below:

In the Claims

In column 11, line 12, in Claim 1, delete "object" and insert -- object, --, therefor.

Signed and Sealed this
Fourth Day of February, 2014

Michelle K. Lee
*Deputy Director of the United States Patent and Trademark Office*